Nov. 28, 1961 J. H. GREENING 3,010,259
BORE GAUGING DEVICE
Filed July 18, 1957 3 Sheets-Sheet 3
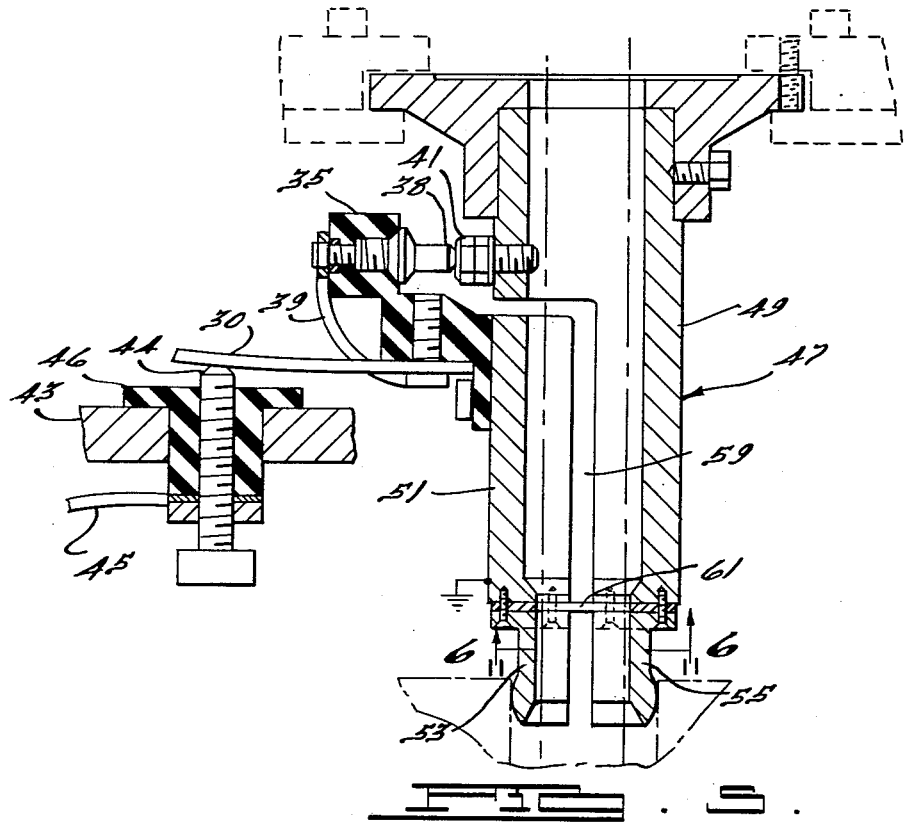
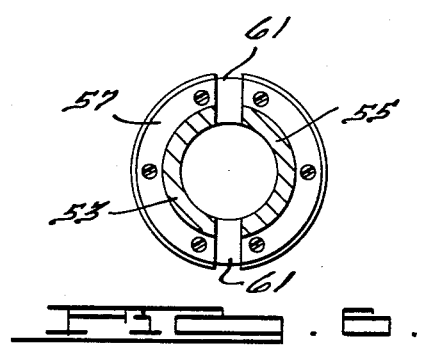
INVENTOR.
John H. Greening.
BY
Harness, Dickey & Pierce
ATTORNEYS.

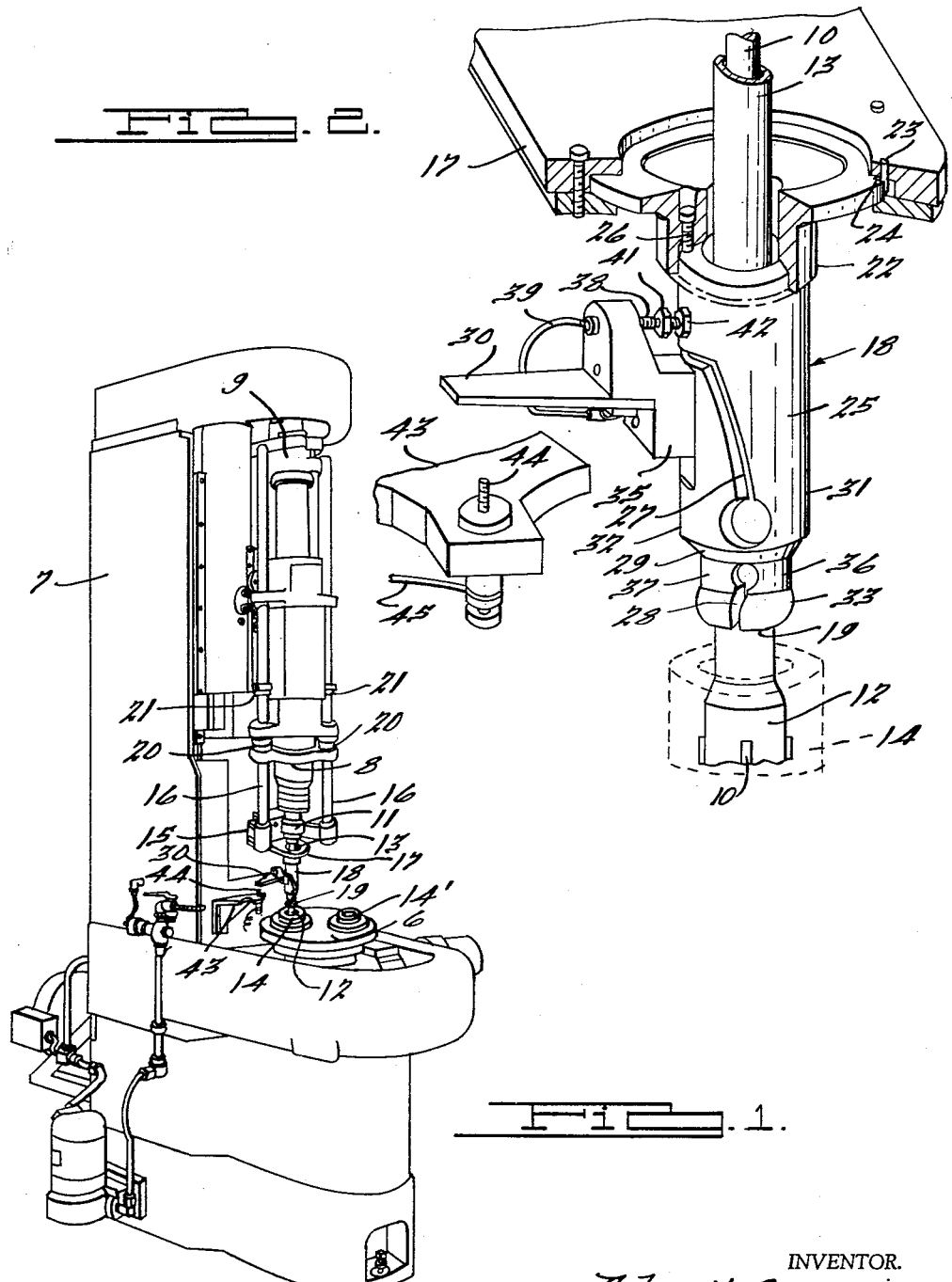

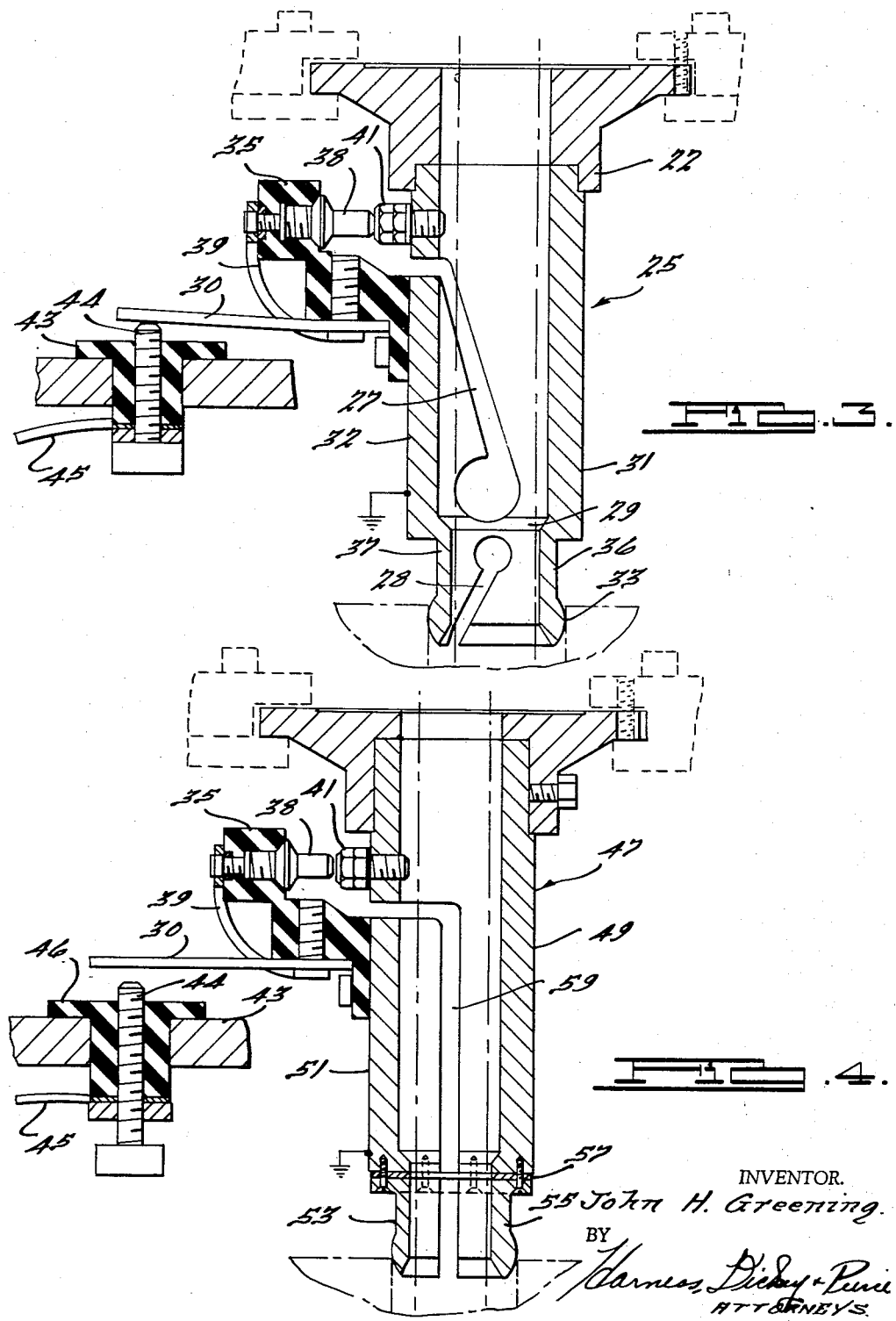

United States Patent Office 3,010,259
Patented Nov. 28, 1961

---

3,010,259
BORE GAUGING DEVICE
John H. Greening, Oak Park, Mich., assignor to Micromatic Hone Corporation, Detroit, Mich., a corporation of Michigan
Filed July 18, 1957, Ser. No. 672,740
14 Claims. (Cl. 51—34)

This invention relates to gauging devices, and particularly to a gauging device which terminates the operation of a machine when the bore of a workpiece is machined to the desired diameter.

The gauging device is in the nature of an inside caliper which gauges the diameter of the bore during each cycle of reciprocation of the machine as soon as the bore is of sufficient size to receive the measuring end of the gauging device. The entry of the gauging device into the bore is a fundamental requirement of the gauging operation and no gauging occurs until the bore is of sufficient diameter to receive the gauge. Once the measuring end of the device enters the bore, the extending portion is contracted to move the measuring ends apart into contact with the bore wall. This is repeated each time the measuring end enters the bore until the expanding movement of the end is sufficient to complete a circuit which controls the termination of the operation of the machine.

One object of the invention is to provide a gauging device and method for gauging a bore of a workpiece with each reciprocation of a bore enlarging tool of a machine.

Another object of the invention is to provide a gauge embodying a practical range of adjustment to suit such variations in bore size as to be capable of matching cooperating components in mass production, and to compensate for wear on the gauge elements.

A further object of the invention is to provide a bore gauge which is readily repairable and replaceable without the necessity of dismantling the tool with which it cooperates.

A still further object of the invention is to provide a gauge which enters the work bore prior to the time the bore size is reached to avoid entry friction and the need for extreme accuracy of alignment of the gauge and bore.

Other objects and features of novelty of the invention will be specifically pointed out or will become apparent when referring, for a better understanding of the invention, to the following description taken in conjunction with the accompanying drawings, wherein:

FIGURE 1 is a perspective view in elevation of a honing machine on which a gauging device embodying features of the present invention is installed;

FIG. 2 is an enlarged broken view of the gauging device illustrated in FIG. 1;

FIG. 3 is a sectional view of the structure illustrated in FIG. 2 with the gauging device in gauging position;

FIG. 4 is a sectional view of structure similar to that illustrated in FIG. 3 showing another form of the invention with the gauging device not in gauging position;

FIG. 5 is a view of the structure illustrated in FIG 4, with the gauging device in gauging position; and FIG. 6 is a sectional view of the structure illustrated in FIG. 5, taken along the line 6—6 thereof.

For the sake of simplicity, FIG. 1 shows the application of this invention to a single-spindle honing machine, but it may be understood that it is equally adaptable to multiple-spindle machines. Such multiple-spindle machines are illustrated in United States Patents Nos. 2,284,325 and 2,386,901, both of which are assigned to the assignee of the present invention. It is to be understood further that the gauging device is shown operating with a honing tool by way of example only since it may be employed with any bore enlarging tool upon which it can be mounted.

In FIG. 1, a honing machine is illustrated having a frame 7 which supports a reciprocable ram or head 8, a hone expansion mechanism 9 and a rotating and reciprocating spindle 11. A honing tool 12 having radially expansible abrasive stones 10 is coupled to the spindle 11 by a hollow driveshaft 13. The bore of a workpiece 14 is abraded and enlarged in diameter as the honing tool 12 is rotated and reciprocated throughout the length thereof and the abrasive stones are fed outwardly by a mechanism 9 which actuates an axially movable rod 10 disposed within the hollow driveshaft 13, as most clearly illustrated in FIG. 2.

It will be observed that two workpieces 14 and 14' are mounted on a rotatable support 6 so that one workpiece may be positioned while the other is being machined. Further, the support 6 is also adapted to be lowered to clear the honing tool 12 when the support is rotated to center another workpiece relative to the axis of the honing tool.

A gauge bracket 15 is secured to the lower ends of vertically movable guide bars 16 and has a collar 17 for supporting the gauge 18 in coaxial relationship with the hollow driveshaft 13. Stop sleeves 20 are carried by bars and engage flanges on the ram 8 when the gauging device has entered the bore where it is held as the tool continues to advance therewithin. Upon the reverse movement of the ram, the tool will move upwardly in the bore until projections on the ram strike the collars 21 on the bars 16 to move the bars and therefore the gauging device from the bore ahead of the tool to withdraw the gauge from operating position upon the retraction of the ram from the workpiece 14 to prevent the abrasive stones from contacting the gauging end 19 thereof. This arrangement also permits the gauge 18 to approach the workpiece as the ram moves the honing tool toward the workpiece and if the bore is large enough the gauging end 19 will advance into the bore until limited by collars 21 to check the bore size. In the event the bore is not sufficiently large to permit the gauging end 19 to enter thereinto, the ram 8 will continue to advance but the gauge 18 and guide bars 16 will stop and the collars 20 will lose contact with the flanges of the ram 8. FIG. 4 illustrates the position of the gauge when the bore is not large enough to receive the gauging end thereof.

The gauging mechanism is best illustrated in FIG. 2 wherein the collar 17 supports a gauge adaptor 22 with its axis parallel to that of the bore of the workpiece 14 in such a manner as to enable the lateral movement of the adapter within the collar produced by the gauging end 19 when centering itself within the bore. The adaptor 22 is prevented from rotating by a pin 23 located in a slot 24 in the adaptor.

Body 25 of the gauge 18 is of unitary construction and is rigidly secured to the adaptor 22 by any suitable means, herein illustrated as by bolts 26. Each pair of diametrically opposed slots 27 and 28 are spaced by a flexible bridge 29 which joins the gauge body portions 31 and 32 at diametrically opposite points. The gauging end 19 of the gauging device has a land 33 of a diameter less than the desired bore diameter to permit it to enter the bore quite some time before the final bore size is reached.

An insulating block 35 is mounted on the upper section of the gauge body portion 32 on which a flexible electrically conductive arm 30 is rigidly secured in such a manner that by flexing the arm a strain will be applied to the diametrically disposed flexible bridges 29 which will spread body portions 36 and 37 of the gauging end 19 apart to have the land portions 33 thereof engage the bore wall at diametrical points. Otherwise stated, the body portion 37, which is on the same side of the gauge as the body portion 32, is rigidly connected to the body portion 32 to form an arm supported for pivotal movement by that portion of the flexible web 29 between the slots 27 and 28. A fixed contact 38 is supported by the insulating block 35 and is conductively joined to the arm 30 by a conductor 39. An adjustable contact 41 is screwed into the body portion 31 and locked in adjusted position by nut 42. When the arm 30 is flexed, the gauge body portion 32 moves toward the gauge body portion 31 advancing the contact 38 toward the contact 41, the degree of movement being controlled by the engagement of the body portions 36 and 37 of the gauging end 19 with the bore.

On the machine column, or work-holding fixture, whichever is most convenient, a bracket 43 is mounted in a position to contact the arm 30 whenever the gauging end 19 is in a specific position within the bore of the workpiece 14. A screw 44 is insulated from the bracket 43 by insulating material 46 and is connected to a conductor 45 of the machine control circuit (not illustrated). The movement of the gauging end 19 into the work bore stresses the arm 30 and the bridges 29, causing the body portions 36 and 37 to expand and move the land portions 33 into contact with said work bore to gauge the diameter thereof. When the work bore is of such dimension as to permit the contacts 38 and 41 to move into engagement upon the expansion of the body portions 36 and 37, a circuit is completed through the conductor 39 and 45 and to ground through the gauge body portion 32 to indicate that the bore size has been reached. If, however, the body portions 36 and 37 are restricted by the bore, to less than the amount of movement required to permit engagement between the contacts 38 and 41, the honing cycle continues uninterruptedly.

In FIG. 4, another form of the invention is illustrated wherein gauge body 47 is made of separate pieces 49, 51, 53 and 55, held in axially aligned relationship by a flexible spring temper washer 57 bolted therebetween. The pieces 51 and 53 being spaced from the pieces 49 and 55 by a gap 59. It will be observed that the arm 30 and screw 44 are not yet closed, and hence, accidental closure of the contacts 38 and 41 during initial entry of the gauge would be of no consequence. This is a significant feature of the invention as it avoids the false tripping characteristic of many present automatic sizing devices.

In FIG. 5, the gauge illustrated in FIG. 4 is shown in gauging position in a bore of the desired final size. Contact is made between the screw 44 and the arm 30 to flex the arm to urge the body portions 53 and 55 against the wall of the bore. Since the bore is the desired final size, the contacts 38 and 41 are closed to complete the circuit for terminating the operation as previously described. As most clearly illustrated in FIG. 6, portions 61 of the washer 57 serve as flexible bridges to permit the necessary relative movement between the separate pieces of the gauge body 47.

For the sake of sensitivity, a minimum of arcing at the contacts 30 and 44, and at 38 and 41, is desirable. This can readily be accomplished through the use of an electronic relay and tube (not shown) wherein the tube is biased to a nonconducting state as long as either of the aforementioned sets of contacts remain open. However, upon the closure of both sets of contacts, as previously described, the tube is rendered conductive to actuate the aforementioned relay to terminate the operation of the machine.

Should it be necessary to change the bore size to be produced, or to compensate for gauge wear, the space between the contacts 38 and 41 may be increased or decreased as required to vary the amount of flexure necessary to close the contacts. Further, gauging of the bore of a workpiece at a greater or lesser depth from its end may be obtained through appropriate adjustment of the screw 44 and a corresponding resetting of the collars 21 to permit the gauge bracket 17 to accommodate itself to the desired new position. By this construction the gauging device is readily adjustable without having to remove it from the machine.

What is claimed is:

1. In a machine having a tool carried by a drive shaft for enlarging the bore of a workpiece, a bore gauging device comprising a sleeve encircling the drive shaft of said tool for reciprocation into and out of said bore after it has been enlarged by said tool, said sleeve having an expansible measuring end and a contractible upper portion spaced therefrom, resilient means mounted on said contractible portion, means outside of said bore for engaging said resilient means and cause it to contract said contractible portion for expanding the measuring end to contact the wall of the bore, and electrical contact means for completing the circuit after the measuring end has expanded a predetermined amount.

2. In a machine having a tool carried by a drive shaft for enlarging the bore of a workpiece, a bore gauging device comprising a sleeve encircling the drive shaft of said tool for reciprocation therewith into and out of said bore, said sleeve having a measuring end with diametrically opposed slots therein and a contractible portion having diametrically opposed slots with a flexible bridge portion connecting the contractible portion with the measuring end, resilient means connected to the contractible portion and adapted to engage an electrically energized stop after the measuring end has been positioned within the bore to expand the measuring end to contact the wall of the bore by contracting the contractible portion, and contact means mounted on the contractible portion for terminating the operation of the machine after the measuring end has expanded a predetermined amount.

3. In a machine having a tool carried by a drive shaft for enlarging the bore of a workpiece, a bore gauging device comprising a sleeve encircling the drive shaft of said tool for reciprocation into and out of said bore, said sleeve having a measuring end split into two sections by diametrically opposed slots and a contractible portion spaced therefrom split into two sections by diametrically opposed slots with a flexible bridge portion connecting said contractible portion with the measuring end, an insulating block mounted upon one of the sections of the contractible portion, a flexible conductive arm mounted upon said insulating block and adapted to engage an electrically energized stop after the measuring end has been positioned within the bore to expand the measuring end, adjustable electrical contact means mounted between the insulating block and the other split section of the contractible portion for completing the electric circuit through the arm and energized stop to terminate the operation of the machine after the measuring end has been expanded a predetermined amount.

4. The subject matter as claimed in claim 3 wherein a support is provided for the device which permits the device to shift normal to the drive shaft so that the measuring end may center itself relative to the bore.

5. The subject matter as claimed in claim 4 wherein means are provided for adjusting said electrically energized stop to vary the distance the measuring end may project into the bore.

6. In a machine having a tool carried by a drive shaft for enlarging the bore of a workpiece, a bore gauging device comprising a sleeve coaxially mounted on the drive shaft of said tool for reciprocation into and out of said bore, said sleeve having an upper and lower portion bolted together with a spring steel washer therebetween, said upper and lower portions each being divided into two sections by diametrically opposed slots so that contraction of the upper portion expands the lower portion with the washer serving as a flexible bridge portion, means on said upper portion and engageable with an element outside of the bore for contracting the upper portion to expand the lower portion to contact the wall of the bore each time it is positioned therein, and means for terminating the operation of the machine when the lower portion expands a predetermined amount.

7. In a machine having a tool carried by a drive shaft for enlarging the bore of a workpiece, a bore gauging device comprising a sleeve coaxially mounted on the drive shaft of said tool for reciprocation into and out of said bore, said sleeve having an upper and lower portion bolted together with a spring steel washer therebetween, said upper and lower portions each being divided into two sections by diametrically opposed slots so that contraction of the upper portion expands the lower portion with the washer serving as a flexible bridge portion, means for expanding the lower portion after it has been positioned within said bore, and means for terminating the operation of the machine when the lower portion has expanded a predetermined amount.

8. In a machine having a tool carried by a drive shaft for enlarging the bore of a workpiece, a bore gauging device comprising a sleeve coaxially mounted on the drive shaft of said tool for reciprocation into and out of said bore, said sleeve having an upper and lower portion bolted together with a spring steel washer therebetween, said upper and lower portions each being divided into two sections by diametrically opposed slots so that contraction of the upper portion expands the lower portion with the washer serving as a flexible bridge portion, resilient means on said upper portion and engageable with an element outside of the bore mounted upon one of the sections of the upper portion and adapted to engage a stop after the lower portion has been positioned within said bore to expand the lower portion into contact with the wall of the bore, and means for terminating the operation of the machine when the lower portion has expanded a predetermined amount.

9. In a machine having a tool carried by a drive shaft for enlarging the bore of a workpiece, a bore gauging device comprising a sleeve coaxially mounted on the drive shaft of said tool for reciprocation into and out of said bore, said sleeve having an upper and lower portion bolted together with a spring steel washer therebetween, said upper and lower portions each being divided into two sections by diametrically opposed slots so that contraction of the upper portion expands the lower portion with the washer serving as a flexible bridge portion, resilient means mounted upon one of the sections of the upper portion and adapted to engage a stop after the lower portion has been positioned within said bore to expand the lower portion into contact with the wall of the bore, and electrical contact means carried by the sections of the upper portion to complete a circuit for terminating the operation of the machine after the lower portion has expanded a predetermined amount.

10. In a machine having a tool carried by a drive shaft for enlarging the bore of a workpiece, a bore gauging device comprising a sleeve coaxially mounted on the drive shaft of said tool for reciprocation into and out of said bore, said sleeve having an upper and lower portion bolted together with a spring steel washer therebetween, said upper and lower portions each being divided into two sections by diametrically opposed slots so that contraction of the upper portion expands the lower portion with the washer serving as a flexible bridge portion, an insulating block mounted on one of the sections of said upper portion, a flexible conductive arm mounted on the insulating block and adapted to engage an electrically energized stop to expand the lower portion after it has been positioned within the bore, adjustable electrical contact means mounted between said insulating block and the other section of the upper portion to complete a circuit for terminating the operation of the machine after the lower portion has expanded a predetermined amount.

11. The subject matter as claimed in claim 10 wherein a support is provided for the device which permits a lateral floating thereof relative to the drive shaft to enable the lower portion thereof to be centered relative to said bore.

12. In a machine having a tool for enlarging the bore of a workpiece, a bore gauging device comprising a gauge body encircling the drive shaft of the tool for reciprocation in and out of the bore, said body having an upper end provided with an inwardly movable portion and a lower end of a width less than that of the bore, said lower end having a movable portion rigidly connected to the movable portion of the upper end which is movable outwardly toward the wall of the bore when the movable portion of the upper end is moved inwardly, contact means on said upper end movable portion, support means for said movable portions yieldable to permit inward movement of said upper end movable portion and outward movement of said lower end movable portion, and means on said upper end movable portion engageable with an element outside of said bore for forcing said upper end movable portion inwardly upon downward movement of the tool in the bore.

13. In a machine having a tool for enlarging the bore of a workpiece, a bore gauging device comprising a gauge body encircling the drive shaft of the tool for reciprocation in and out of the bore, said body having a lower gauging end of less diameter than the bore containing an outwardly movable portion engageable with the wall of the bore, means for movably supporting said outwardly movable portion, an upper inwardly movable extension on said lower movable portion, means on said upper movable extension engageable with an element outside of the bore for moving the upper movable extension inwardly upon the downward movement of the gauging end into the bore for expanding the gauging end into engagement with opposite points of the bore, and contact means carried by said upper movable extension for completing a circuit when the bore size is reached.

14. In a machine having a tool for enlarging the bore of a workpiece, a bore gauging device comprising a sleeve encircling the drive shaft of said tool for reciprocation into and out of said bore, said sleeve having an expansible measuring end of lesser diameter than the end of said bore and a contractible portion spaced therefrom, inward movement of said contractible portion expanding said measuring end, means mounted on said contractible portion and engageable with an element outside of the bore after the measuring end is positioned within the bore to contract said contractible portion and expand the measuring end into contact with opposite portions of the wall of the bore, and contact means mounted on said contractible portion for terminating the operation of the machine when the measuring end has expanded to the desired diameter within the bore.

References Cited in the file of this patent

UNITED STATES PATENTS

| | | |
|---|---|---|
| 1,926,214 | Raule | Sept. 12, 1933 |
| 2,023,662 | Blood | Dec. 10, 1935 |
| 2,732,670 | Foster | Jan. 31, 1956 |
| 2,787,865 | Gross | Apr. 9, 1957 |

FOREIGN PATENTS

| | | |
|---|---|---|
| 693,706 | Great Britain | July 8, 1953 |

UNITED STATES PATENT OFFICE
CERTIFICATE OF CORRECTION

Patent No. 3,010,259                           November 28, 1961

John H. Greening

It is hereby certified that error appears in the above numbered patent requiring correction and that the said Letters Patent should read as corrected below.

Column 4, line 62, for the claim reference numeral "4" read -- 3 --; column 5, lines 31 and 32, strike out "on said upper portion and engageable with an element outside of the bore", and insert the same after "means" in line 16, same column 5.

Signed and sealed this 12th day of June 1962.

(SEAL)
Attest:

ERNEST W. SWIDER
Attesting Officer

DAVID L. LADD
Commissioner of Patents